US007837562B2

(12) United States Patent
Griswold et al.

(10) Patent No.: US 7,837,562 B2
(45) Date of Patent: Nov. 23, 2010

(54) DISPLAY PANEL FOR A GAMING APPARATUS

(75) Inventors: Chauncey W. Griswold, Reno, NV (US); Joseph R. Hedrick, Reno, NV (US)

(73) Assignee: IGT, Reno, NV (US)

( * ) Notice: Subject to any disclaimer, the term of this patent is extended or adjusted under 35 U.S.C. 154(b) by 568 days.

(21) Appl. No.: 10/176,341

(22) Filed: Jun. 20, 2002

(65) Prior Publication Data

US 2003/0236114 A1 Dec. 25, 2003

(51) Int. Cl.
*A63F 13/00* (2006.01)
*A63F 13/08* (2006.01)

(52) U.S. Cl. ............................ 463/46; 463/12; 463/13; 463/16; 463/17; 463/18; 463/19; 463/20; 463/30; 463/31; 463/42

(58) Field of Classification Search ............. 463/12–13, 463/16–20, 30–31, 42, 46; 273/138.1, 143 R
See application file for complete search history.

(56) References Cited

U.S. PATENT DOCUMENTS 4,278,973 A * 7/1981 Hughes et al. ................ 345/26
4,359,222 A * 11/1982 Smith et al. ................... 463/31
4,517,558 A * 5/1985 Davids ....................... 345/629
4,559,533 A * 12/1985 Bass et al. .................. 715/790
4,792,720 A * 12/1988 Takenaka et al. ............ 313/409
4,856,787 A 8/1989 Itkis
5,579,031 A * 11/1996 Liang ......................... 345/604
5,611,535 A * 3/1997 Tiberio .................... 273/143 R
D395,463 S 6/1998 Scott et al. ................... D21/38
5,813,914 A * 9/1998 McKay et al. ................ 463/46

(Continued)

FOREIGN PATENT DOCUMENTS

DE 299 16 660 U1 12/1998

(Continued)

OTHER PUBLICATIONS

International Search Report for PCT/US 03/18261 dated, Oct. 31, 2003.

(Continued)

*Primary Examiner*—Peter DungBa Vo
*Assistant Examiner*—William H McCulloch
(74) *Attorney, Agent, or Firm*—Weaver Austin Villeneuve & Sampson LLP

(57) ABSTRACT

A gaming apparatus may include a housing, a display unit capable of generating video images, a value input device, a controller operatively coupled to the display unit and the value input device, and a panel at least partially overlaying the display unit. The housing may include a first opening and a second opening. The display unit may be positioned relative to the housing so that a first portion of the display unit is visible through the first opening and the second portion of the display unit is visible through the second opening. The controller may comprise a processor and a memory, and may be programmed to allow a person to make a wager, to cause a first video image to be generated on the first portion of the display unit and a second video image to be generated on the second portion of the display unit, and to determine a value payout associated with an outcome of the game.

34 Claims, 14 Drawing Sheets

U.S. PATENT DOCUMENTS

| | | | | |
|---|---|---|---|---|
| 5,825,613 | A * | 10/1998 | Holden | 361/681 |
| 5,848,932 | A * | 12/1998 | Adams | 463/20 |
| 5,947,820 | A * | 9/1999 | Morro et al. | 463/9 |
| 6,079,709 | A * | 6/2000 | Ethridge et al. | 273/148 B |
| 6,133,966 | A | 10/2000 | Dyballa | 348/842 |
| 6,135,884 | A * | 10/2000 | Hedrick et al. | 463/20 |
| 6,159,098 | A | 12/2000 | Slomiany et al. | 463/25 |
| 6,164,645 | A * | 12/2000 | Weiss | 273/138.2 |
| 6,168,522 | B1 * | 1/2001 | Walker et al. | 463/25 |
| 6,201,532 | B1 * | 3/2001 | Tode et al. | 345/156 |
| 6,254,481 | B1 * | 7/2001 | Jaffe | 463/20 |
| 6,368,216 | B1 | 4/2002 | Hedrick et al. | 463/20 |
| 6,435,970 | B1 * | 8/2002 | Baerlocher et al. | 463/46 |
| 6,475,087 | B1 * | 11/2002 | Cole | 463/20 |
| 6,569,018 | B2 * | 5/2003 | Jaffe | 463/30 |
| 6,588,749 | B1 * | 7/2003 | Tastad | 273/148 R |
| 6,620,047 | B1 | 9/2003 | Alcorn et al. | 463/37 |
| 6,712,702 | B2 * | 3/2004 | Goldberg et al. | 463/42 |
| 6,820,875 | B1 * | 11/2004 | Hedrick et al. | 273/138.1 |
| 6,962,528 | B2 * | 11/2005 | Yokota | 463/25 |
| 6,976,919 | B2 * | 12/2005 | Cole | 463/46 |
| 7,025,674 | B2 | 4/2006 | Adams et al. | 463/1 |
| 2001/0000636 | A1 * | 5/2001 | Weiss | 273/138.2 |
| 2002/0002078 | A1 | 1/2002 | Jaffe | 463/30 |
| 2002/0025844 | A1 | 2/2002 | Casey et al. | 463/16 |
| 2002/0045474 | A1 | 4/2002 | Singer et al. | 463/20 |
| 2003/0083943 | A1 * | 5/2003 | Adams et al. | 705/14 |
| 2004/0137978 | A1 * | 7/2004 | Cole et al. | 463/16 |

FOREIGN PATENT DOCUMENTS

| | | | |
|---|---|---|---|
| EP | 0 738 991 | | 10/1996 |
| EP | 0 738 991 | A2 | 10/1996 |
| EP | 1 063 622 | | 12/2000 |
| GB | 2 335 066 | A | 9/1999 |
| RU | 17678 | | 4/2001 |
| WO | 01/12281 | | 2/2001 |
| WO | WO 01/12281 | A1 | 2/2001 |
| WO | WO 01/64306 | A2 | 9/2001 |
| WO | WO 01/66208 | A2 | 9/2001 |

OTHER PUBLICATIONS

Communication from the European Patent Office with respect to European Application No. 03 736 978.2 dated Apr. 19, 2006 (5 pages).

Official Action (with translation) from the Russian Patent Office with respect to Russian Application No. 2005101221/09 dated Apr. 20, 2006 (15 pages).

Gambler's Paradise, Slot Machine & Game Sales, Williams Video "Reel Em In Cast for Cash" .05 Sharp, [On-line] Available: http://www.slotsforsale.com/shopping/pgm-more_information.php?id=136&customernumber=3425580222538&=SID (2004) (5 pages).

Decision of Grant for Russian Patent Application No. 2005101221 (w/translation).

Decision to refuse a European patent application and minutes of the oral proceedings before the Examining Division in accordance with the Rule 76(4) EPC dated Jan. 15, 2008 from European Patent application No. 03736982.2, 16 pages.

Office Action for European Patent Application No. 03 736 978.2 dated Aug. 3, 2007.

Australia Examination Report dated Jun. 2, 2009 from Application No. 2007231885, 1 pg.

European Office Action dated May 27, 2005 from Application No. 03736978.2, 3 pgs.

* cited by examiner

66

FIG. 12
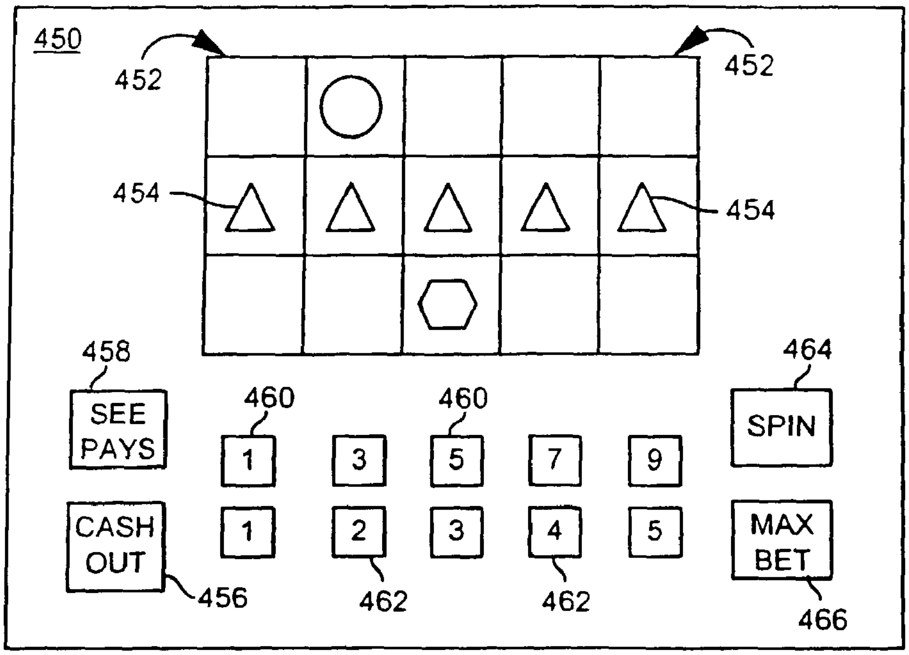
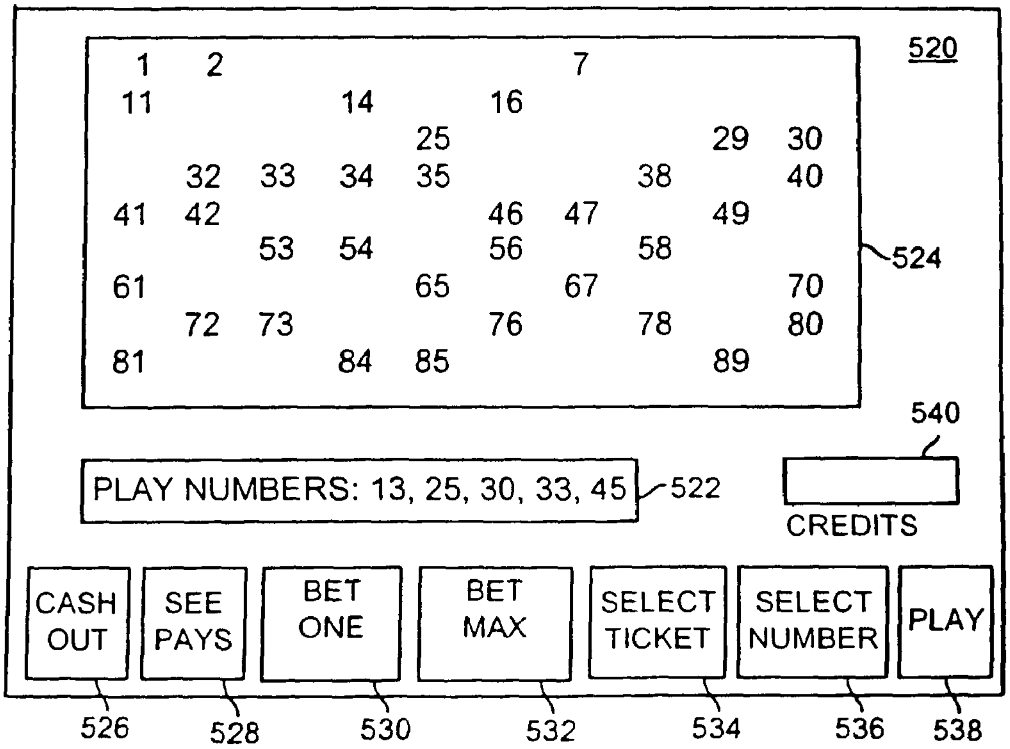
FIG. 13

DISPLAY PANEL FOR A GAMING APPARATUS

BACKGROUND

This patent is directed to a casino gaming apparatus, which could be either an individual gaming unit or a casino gaming system having a plurality of gaming units, each gaming unit including multiple display panels made up of a single, subdivided display.

Conventional casino gaming units often included multiple display panels for displaying a variety of images. The gaming unit consisted of three separate display panels: the top glass, the bottom (or "belly") glass, and the primary display. The top glass and the belly glass were typically static images that provided game instructions, game information, images to attract players to the game, or images otherwise associated with the games that could be played on the gaming unit. The primary display has included active images that may vary as part of a player-attract sequence or as part of the game play. Mechanical moving parts were often used to display a variety of images as part of the game play. For example, in a convention slot machine, the primary display was a "reel glass" having multiple spinning reels with various images on each reel. A front panel was part of the game unit housing and included a control panel. The front panel was sometimes designed to correspond to the game of the gaming unit.

SUMMARY OF THE INVENTION

In one aspect, the invention is directed to a gaming apparatus that may include a housing, a display unit capable of generating video images, a value input device, and a controller operatively coupled to the display unit and the value input device. The housing may include a first and a second opening. The display unit may be positioned relative to the housing so that a first portion of the display unit is visible through the first opening and the second portion of the display unit is visible through the second opening. The controller may comprise a processor and a memory, and may be programmed to allow a person to make a wager, to cause a first video image to be generated on the first portion of the display unit and a second video image to be generated on the second portion of the display unit, and to determine an outcome of the game and a value payout associated with the outcome of the game.

At least one of the first and second video images may represent one of the following games: video poker, video blackjack, video slots, video keno and video bingo, in which case the at least one video image may comprise an image of at least five playing cards if the game comprises video poker; the at least one video image may comprise an image of a plurality of simulated slot machine reels if the game comprises video slots; the at least one video image may comprise an image of a plurality of playing cards if the game comprises video blackjack; the at least one video image may comprise an image of a plurality of keno numbers if the game comprises video keno, and the at least one video image may comprise an image of a bingo grid if the game comprises video bingo.

The housing may include a first housing and a second housing. The housing may also include a main housing portion and a panel coupled to the main housing portion. The panel may be removably coupled to the main housing portion. The panel may include the value input device and/or an input control panel. A transparent material may be disposed over an opening of the housing. The display unit may be a flat panel display. The first and/or second video images may represent a bonus game, a payout table, game information, game instructions and/or an attraction sequence. Also, the first and/or second video images may be a static video image and/or an active video image.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 12 is an illustration of an embodiment of a visual display that may be displayed during performance of a video slots routine of FIG. 14;

FIG. 13 is an illustration of an embodiment of a visual display that may be displayed during performance of a video keno routine of FIG. 15;

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
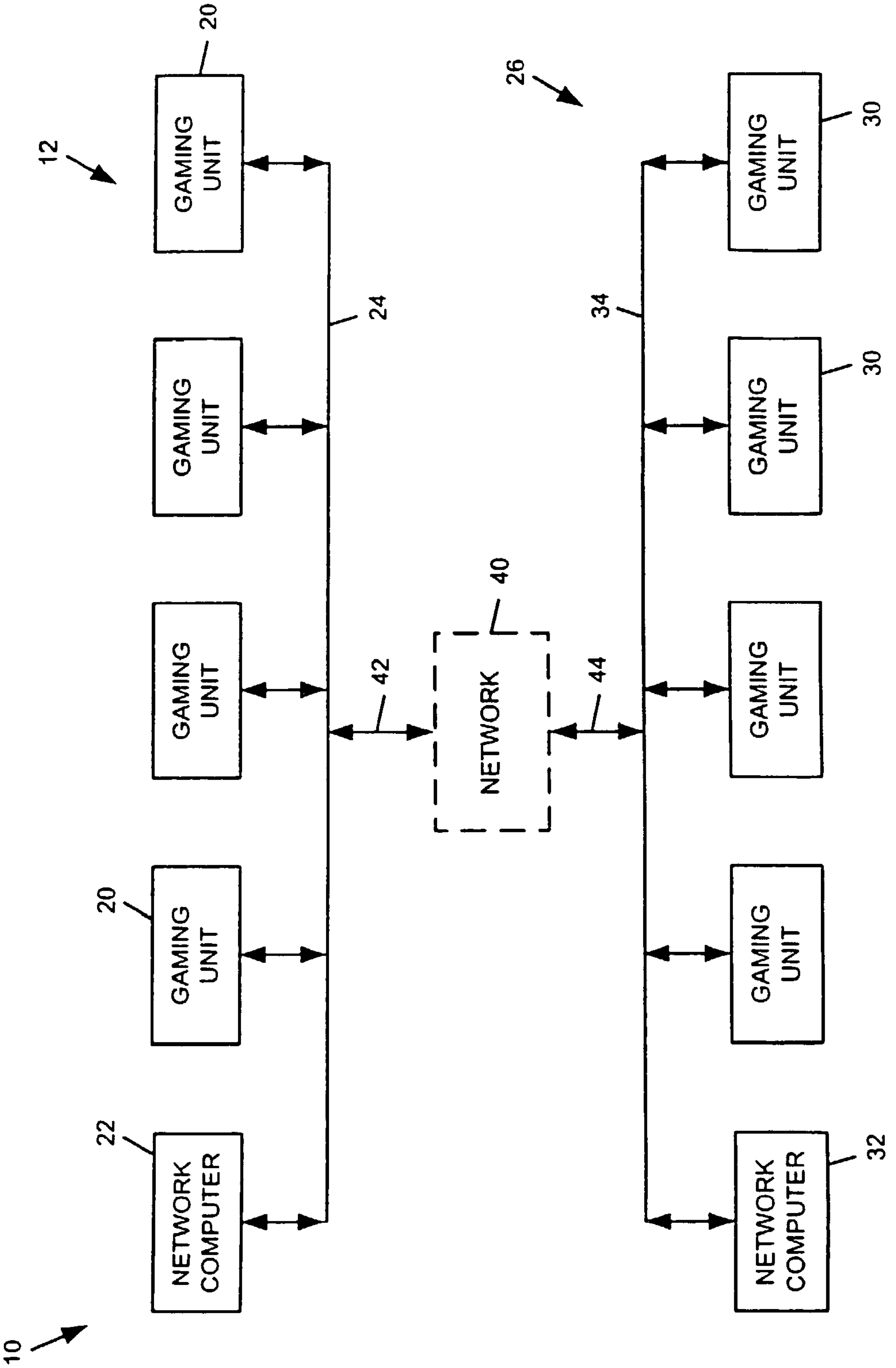
FIG. 1 is a block diagram of an embodiment of a gaming system in accordance with the invention.

FIG. 1 illustrates an embodiment of a casino gaming system 10 in accordance with the invention. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may provided as a dedicated hardwired link or a wireless link. Although the data link 24 is shown as a single data link 24, the data link 24 may comprise multiple data links.

Gaming Unit

Figure 2:
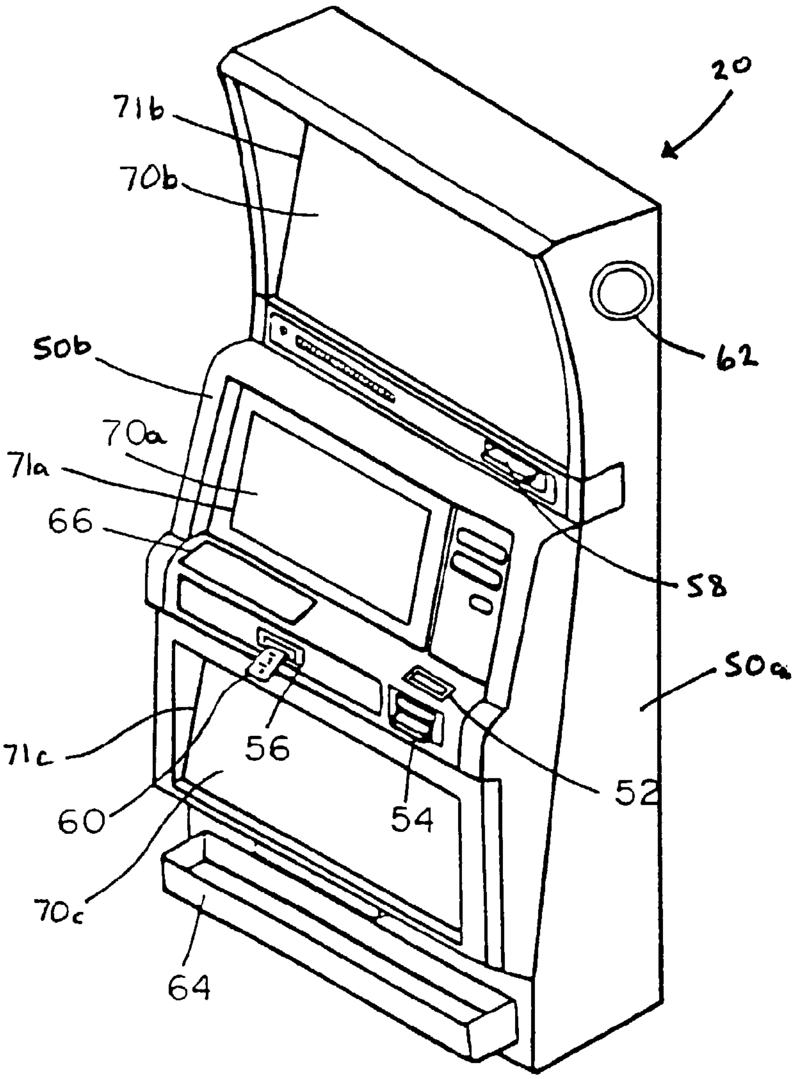
FIG. 2 is a perspective view of an embodiment of one of the gaming units shown schematically in FIG. 1 in accordance with the invention.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50*a*, 50*b* and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin payout tray 64, an input control panel 66, and one or more video display units 70 for displaying video images relating to the game or games provided by the gaming unit 20. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc.

Gaming Unit Display

The video display unit 70 may be a single display that displays video images on a screen (not shown) apportioned into multiple display areas, such as a primary display area 70*a*, a top display area 70*b* and a bottom display area 70*c*. That is, the display areas may represent display panels of a gaming machine such as a primary display, a top panel (i.e., top glass) and a bottom panel (i.e., belly glass), where the video image of each display area is a representation of the contents of each corresponding display panel. The number of display units in a gaming unit 20 and how their video images are apportioned may vary according to overall requirements of the gaming unit, the game routine(s) or the preferences of the manufacturer. For example, the gaming unit 20 may include multiple video display units 70 where one video display unit 70 may also be used to show multiple display areas, whereas a second video display unit 70 may show only a single display area. In addition, the number, shape, placement and dimensions of the display areas 70*a*, 70*b*, 70*c* may be varied anywhere within the screen of the video display unit 70. The following will describe a gaming apparatus using a single video display unit 70 for multiple display areas. However, as understood by those of ordinary skill in the art, and as described above, more than one video display unit 70 may be used to show one or more of the display areas and the description of the video display unit 70 below may be applicable to any video display unit 70 in the case of multiple display units in a gaming unit 20.

The video display unit 70 may be a flat display screen having a 16:9 aspect ratio (i.e., width-to-height ratio) that is turned lengthwise on its side (i.e., 9:16 aspect ratio), though other screen proportions may be used as well. The proportions of the video display unit 70 may be dependent on the overall size of the gaming unit 20, as well as the desired attributes of the display areas 70*a*, 70*b*, 70*c*. As seen in FIG. 2, each of the display areas 70*a*, 70*b*, 70*c* may vary in shape, placement and dimensions on the gaming unit 20. For example, the primary display area 70*a* may be smaller than and set off more to the right than the top display area 70*b*. To use a single video display unit 70 for all three display areas 70*a*, 70*b*, 70*c* may require a video display unit 70 having a screen height at least equal to the distance from the top of the uppermost desired display area 70*b* to the bottom of the bottommost desired display area 70*c*. The width may generally be the widest point between the rightmost and leftmost edges of the display areas, which in FIG. 2 may be the top display area 70*b*.

The above has been described in terms of the dimensions of the screen of the video display unit 70 for the gaming unit 20. As can be seen from this disclosure, the disclosed embodiments are applicable to gaming units that may be embodied in a variety of devices ranging from handheld devices such as personal digital assistants (PDA), cellular or standard phones with display screens, computer screens, televisions, large projection screens, or any other device that may include a video display unit. Given that the gaming unit may be embodied in a variety of devices that may range in size, the actual size of the video display unit 70 may also vary widely. The dimensions of the screen of the video display unit 70 may range from approximately 15 inches (approximately 38 cm) to approximately 25 inches (approximately 64 cm) wide, and approximately 27 inches (approximately 69 cm) to approximately 41 inches (approximately 104 cm) in height for an upright gaming unit 20. However, the dimensions of the display screen may also include any of the following. In one example of a gaming unit 20, the screen may have dimensions in the range of approximately 14 inches (approximately 36 cm) to approximately 24 inches (approximately 61 cm) in width, and approximately 11 inches (approximately 28 cm) to approximately 18 inches (approximately 46 cm) in height. Alternatively, the gaming unit 20 may have a larger screen with a height in the range of approximately 11 inches (approximately 28 cm) to approximately 27 inches (approximately 69 cm). A gaming unit 20 having these dimensions may include a slant top gaming unit. In another example, the gaming unit 20 may include a screen having a range of dimensions of approximately 14 inches (approximately 36 cm) to approximately 20 inches (approximately 51 cm) in width, and approximately 11 inches (approximately 28 cm) to approximately 14 inches (approximately 36 cm) in height. Such a gaming unit 20 may include a table top or bartop gaming unit.

The depth of the video display unit 70 may range from approximately 3 inches (approximately 8 cm) to approximately 8 inches (approximately 20 cm) for most conventional flat screen technologies, but with the advent of newer display technologies mentioned herein, the depth can be reduced to approximately 0.2 millimeters or less. Furthermore, as recognized by those of ordinary skill in the art, the overall scope of the claimed invention is not limited by specific dimensions, and may include other display units 70 applicable to a variety of gaming unit types such as upright gaming units, flat top (tabletop) gaming units, slanted gaming units, gaming units having jumbo screens, palm-sized gaming units, etc.

Figure 3:
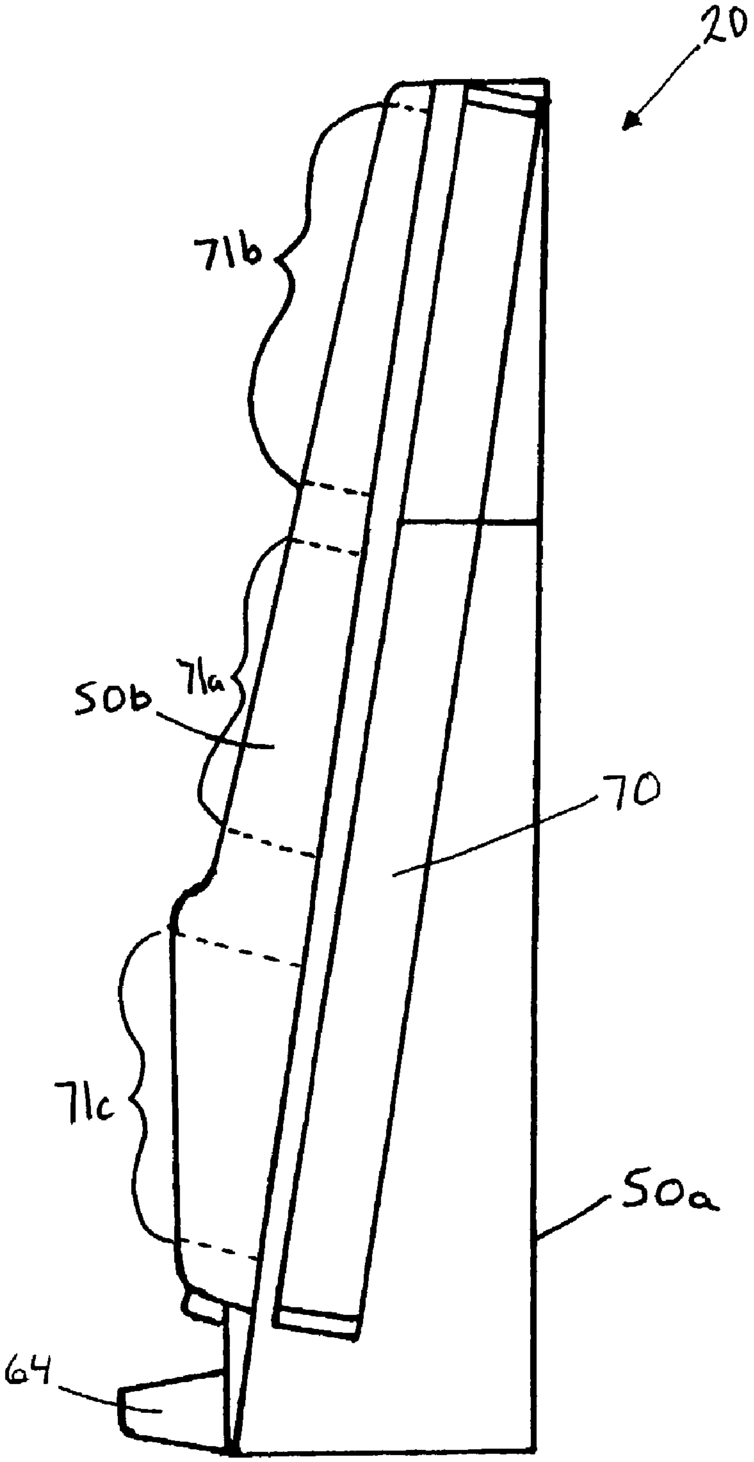
FIG. 3 is a side view of the gaming unit of FIG. 2 with a partial cutaway of the housing.

Referring to FIGS. 2 and 3, the screen of the video display unit 70 may be approximately the same size as the frontal area of the gaming unit 20, such that the screen may take up almost the entire frontal area of the gaming unit 20. This allows the screen to be apportioned into almost any number of display areas of varying shapes, placement, and dimensions, limited only by the size of the frontal area of the gaming unit 20 (i.e., approximately the size of the screen of the video display unit 70). Furthermore, as shown in FIG. 3 the video display unit 70 may sit within the main housing 50*a* of the gaming unit 20. The orientation of the video display unit 70 may also vary from upright, slanted, tabletop or bartop. With some video display technologies, it is also possible that the video display unit 70 may be flexible thereby allowing curves to be included in the video display unit's orientation. However, as mentioned above, multiple video display units 70 may be used in the gaming unit 20. Together the screens of the multiple display units 70 may be approximately the same size as the frontal area of the gaming unit 20.

The video display unit 70 may comprise a large area plasma display panel (PDP), a liquid crystal display (LCD), a liquid crystal on silicon (LCOS) display, a light emitting diode (LED) display, a ferroelectric LCD display, a field emissions display (FED), an electroluminescent display (ELD), a front projection display, a rear projection display, and a microelectromechanical device (MEM) display such as a digital micromirror device (DMD) display or a grating light valves (GLV) display, etc. The video display unit 70 may further include organic display technologies such as an organic electroluminescent (OEL) display and an organic light emitting diode (OLED) display, as well as a light emitting polymer display. The video display unit 70 is not limited to flat-panel-display (FPD) technology though most of the above examples are different types of FPD technology that make the depth of the video display unit 70, and hence the gaming unit 20, relatively thin especially as compared to a cathode ray tube (CRT) display. This may allow more gaming units 20 to be included in a given area as compared to gaming units that utilize a CRT display as well as making the gaming units 20 lighter. However, CRT display technology, include short neck or bent neck CRTs, may be used for the video display unit 70. In addition, the video display unit 70 may be a touch-sensitive display for control of a game routine by a player such that one display area may display the gaming icons whereas a second display may display the controls for operating the game.

The housing may include a main housing 50*a* and a front panel 50*b*. The front panel 50*b* may be removably positioned over the video display unit 70, though the front panel 50*b* may not overlie the entire video display unit 70. For example, as seen in FIG. 2, the front panel 50*b* may overlay about the bottom two-thirds of the video display unit 70. The housing 50 of the gaming unit 20 may be used to frame the top display area 70*b*. Similar positioning may be accomplished with multiple video display units 70, where the front panel 50*b* may be removably positioned over only one or more, but not all, of the video display units 70 or only partially over a video display unit 70. However, as an alternative embodiment, the front panel 50*b* may also overlay the entire video display unit 70 as shown in FIG. 3, or all the video display units 70 in the case of multiple video display units.

The front panel 50*b* may be designed in relation to the game routine(s) that are played on the gaming unit 20 or designed in accordance with an overall theme of a group or carousel of gaming units. If the gaming unit 20 is reprogrammed with a different game routine, the front panel 50*b* may be removed and replaced with a new front panel having a design corresponding to the new game routine(s). Attachment or detachment may be achieved by a variety of devices, such as screws, bolts, metal/plastic snaps, clips, or any other removable fastening devices as known in the art. Any or all of the following may be included in the front panel 50*b*: the coin slot or acceptor 52, the paper currency acceptor 54, the ticket reader/printer 56, the card reader 58, the coin payout tray 64 and/or the control panel 66. However, some or all of the above may not be included in the front panel 50*b*. For example, if one or more of the components 52, 54, 56, 58, 64, 66 are too deep to be included in the front panel 50*b*, for instance because they would interfere with the positioning of the video display unit 70, the components 52, 54, 56, 58, 64, 66 may be positioned to the side of or top of the front of the gaming unit 20, either in the front panel 50*b* or in the main housing 50*a*.

Alternatively or in addition, the control panel 66 may be replaced with a touch-sensitive display as mentioned above. The coin acceptor 52, paper currency acceptor 54, ticket reader/printer 56, card reader 58, and/or coin payout tray 64 may be removed in favor electronic currency transfer which may also be controlled through a touch-sensitive display. Removable connections, such as conventional computer cables, may be included to connect any of the components 52, 54, 56, 58, 64, 66 to the electronics of the gaming unit 20 yet still allow for removable detachment of the entire front panel 50*b* from the rest of the gaming unit 20. Alternatively, the connections between the components 52, 54, 56, 58, 64, 66 and the electronics of the gaming unit 20 may be wireless. The electronics of the gaming unit 20 are described below.

The front panel 50*b* may further include cutouts or openings 71*a*, 71*b*, 71*c* corresponding to the display areas of the gaming unit 20 (i.e., the primary display area 70*a*, the top display area 70*b* and the bottom display area 70*c*). In the case of FIG. 2, the upper opening 71*b* corresponding to the top display area 70*b* is framed in part by the main housing 50*a* of the gaming unit 20, because the front panel 50*b* does not overlie the entire video display unit 70. However, for purposes of this disclosure the front panel 50*b* will be described as having an opening 71*b* for the top display area 70*b*, as indicated in FIG. 3. In order to show video images through the openings 71*a*, 71*b*, 71*c*, a computer or controller for the gaming unit 20 may include graphics software for programming the display areas 70*a*, 70*b*, 70*c* to be displayed on the video display unit 70 in accordance with the shape, placement and dimensions of the openings 71*a*, 71*b*, 71*c* of the front panel 50*b*. The graphics software may be software similar to that used for concurrently displaying various screens or display areas on computer screens or television screens. The front panel 50*b* thereby acts as a framework for the front of the gaming unit 20 by overlaying and covering those portions of the video display unit 70 that may not have graphics while allowing the player to view those portions of the display unit that have graphics (i.e., display areas 70*a*, 70*b*, 70*c*). In effect, the openings 71*a*, 71*b*, 71*c* of the front panel 50*b* and the display areas 70*a*, 70*b*, 70*c* of the video display unit 70 together end up representing display panels without using a naked display, yet may allow each display panel to include active video images with fewer display units.

As with the display areas 70*a*, 70*b*, 70*c*, the openings 71*a*, 71*b*, 71*c* may vary in shapes, placement and dimensions with respect to other openings in the front panel 50*b* or with respect to openings of other front panels just as the video display unit 70 may be apportioned into display areas of varying shapes, placement and dimensions. The openings 71*a*, 71*b*, 71*c* may further include a transparent material such as glass, plexiglass, plastic, etc. to protect the display unit 70 yet permit the player to view the images. The gaming unit 20 may be updated in its appearance and/or game routine(s) by merely programming the controller with the graphics software of the new game routine(s) and replacing the removable front panel 50*b* with a new front panel corresponding to the new game routine(s). The gaming unit 20 may be reprogrammed locally or via the download of the new game routine(s), which may be accomplished from the network computer 22, 32, the network 40 or another remote location. Therefore, an entire gaming unit can be transformed into a different gaming unit with relative ease.

Alternatively, in the case of multiple video display units 70, two or more of the openings 71*a*, 71*b*, 71*c* may overlay a single video display unit 70 as described above, while other openings may correspond to individual video display units 70. The graphics software may program each video display unit 70 to display video images corresponding to the one or more areas that the video display unit 70 represents.

The video images for each opening or video display unit 70 may vary among each display area 70*a*, 70*b*, 70*c*. For example, the primary display area 70*a* may include video images relating to the performance of the game routine, whereas the top display area 70*b* may display video images of payout tables relating to the game routine. Alternatively, the top display area 70*b* may display video images representing a bonus game or game instructions. The bottom display 70*c* may display other video images or illustrations relating to the game routine. Examples of video images relating to the performance of the game routines such as video poker, video slots, video blackjack, video keno and video bingo are described in further detail below. In a further example, the display areas 70*a*, 70*b*, 70*c* together could display a single, continuous image where the top display area 70*b* displays the top of the image, the primary display area 70*a* displays the middle of the image and the bottom display area 70*c* displays the bottom of the image. The video images described above are merely examples and are not limited in type or to any particular display area. Each of the video images may be either static, active (e.g., multimedia video) or a combination of both. Furthermore, the video images may be in either color or grayscale. Each of the display areas 70*a*, 70*b*, 70*c* may display various images as part of an attraction sequence when the game routine is not performed. An example of an attraction sequence is further described below.

Control Panel

Figure 4:
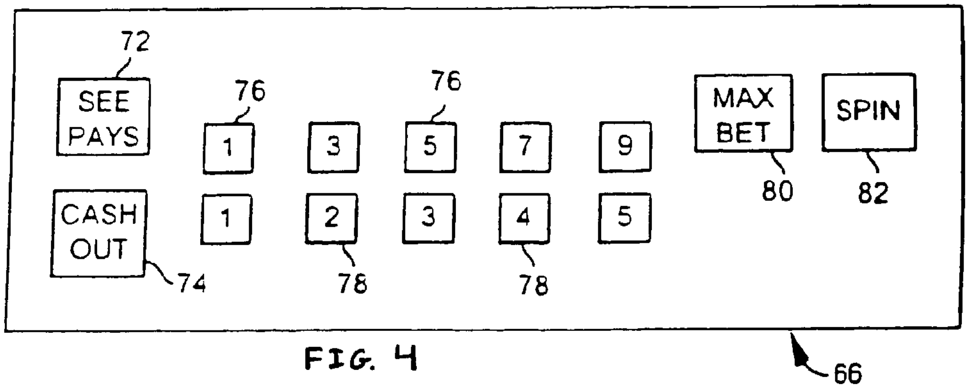
FIG. 4 illustrates an embodiment of a control panel for a gaming unit.

FIG. 4 illustrates one possible embodiment of the control panel 66, which may be used where the gaming unit 20 is a slot machine having a plurality of mechanical or "virtual" reels. Referring to FIG. 4, the control panel 66 may include a "See Pays" button 72 that, when activated, causes the video display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 4, a rectangle is shown around the buttons 72, 74, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the video display unit 70, it should be understood that the control panel 66 could be generated by the video display unit 70. In that case, each of the buttons of the control panel 66 could be a colored area generated by the video display unit 70, and some type of mechanism may be associated with the video display unit 70 to detect when each of the buttons was touched, such as a touch-sensitive screen.

Gaming Unit Electronics

Figure 5:
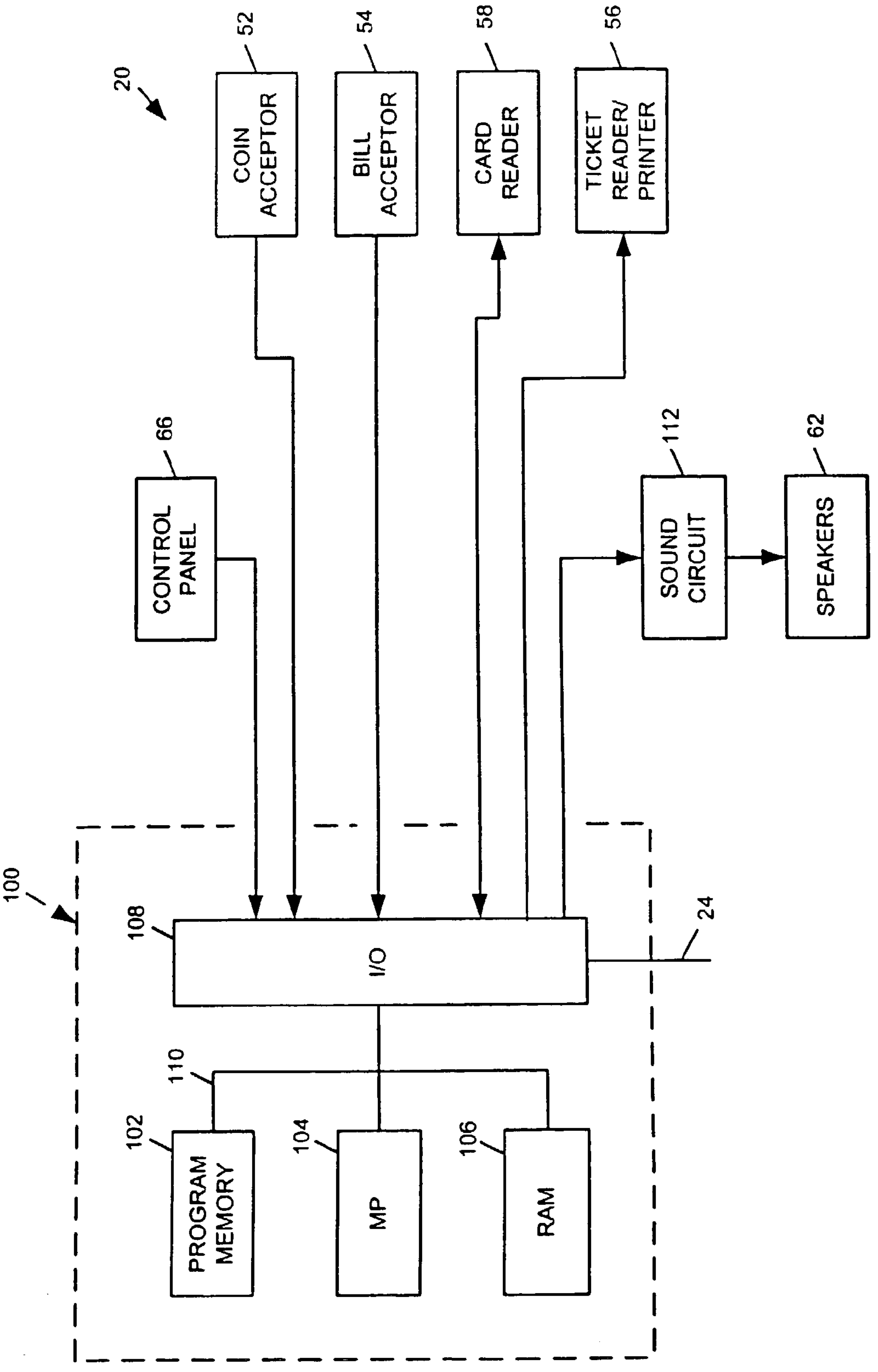
FIG. 5 is a block diagram of the electronic components of the gaming unit of FIG. 2.

FIG. 5 is a block diagram of a number of components that may be incorporated in the gaming unit 20. Referring to FIG. 5, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

Although the program memory 102 is shown in FIG. 5 as a read-only memory (ROM) 102, the program memory of the controller 100 may be a read/write or alterable memory, such as a hard disk. In the event a hard disk is used as a program memory, the address/data bus 110 shown schematically in FIG. 5 may comprise multiple address/data buses, which may be of different types, and there may be an I/O circuit disposed between the address/data buses.

FIG. 5 illustrates that the control panel 66, the coin acceptor 52, the bill acceptor 54, the card reader 58 and the ticket reader/printer 56 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 5, the components 52, 54, 56, 58, 66, 112 may be connected to the I/O circuit 108 via a respective direct line or conductor. Different connection schemes could be used. For example, one or more of the components shown in FIG. 5 may be connected to the I/O circuit 108 via a common bus or other data link that is shared by a number of components. Furthermore, some of the components may be directly connected to the microprocessor 104 without passing through the I/O circuit 108.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C+, C++ or the like or any low-level, assembly or machine language. By storing the computer program portions therein, various portions of the memories 102, 106 are physically and/or structurally configured in accordance with computer program instructions.

Figure 6:
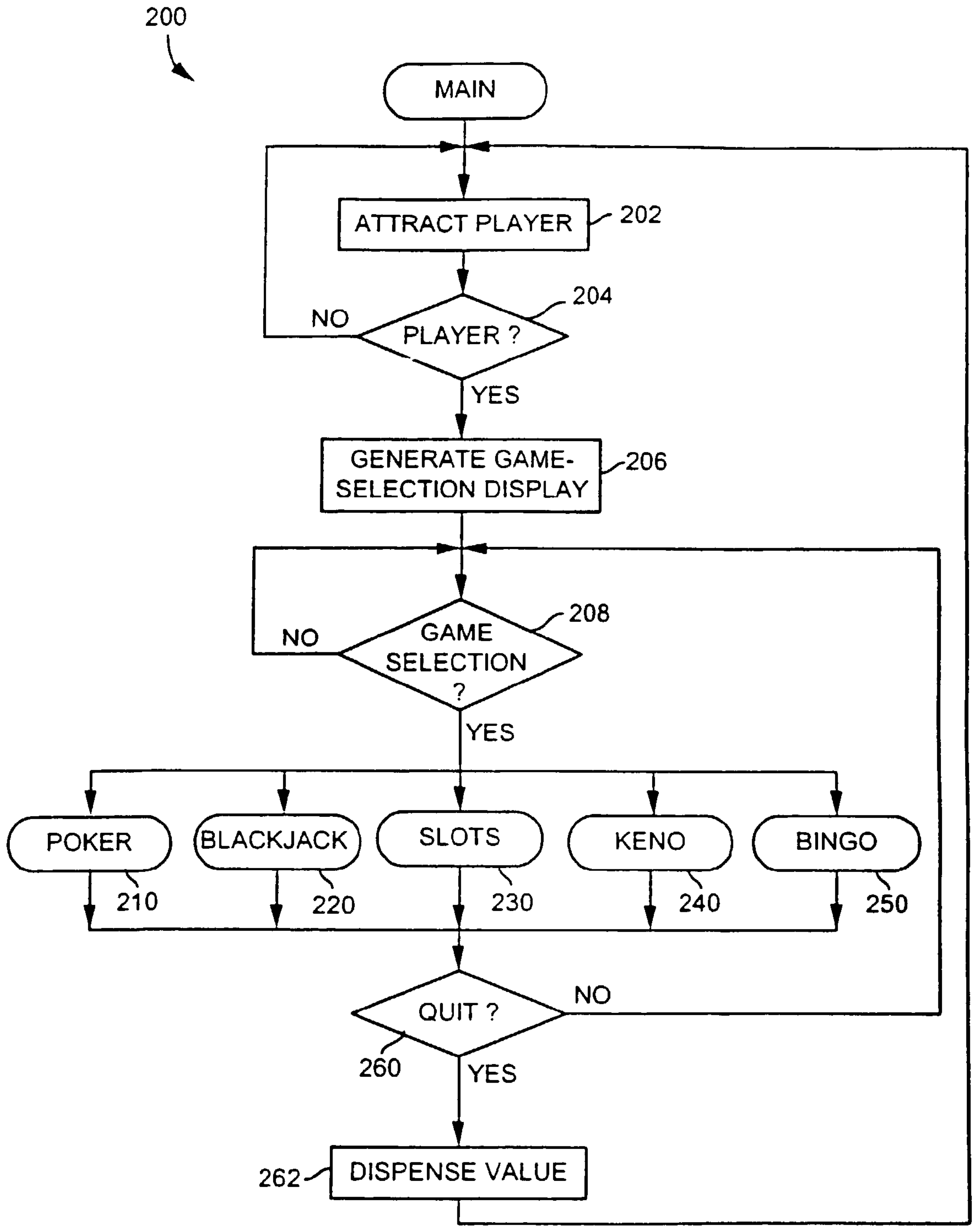
FIG. 6 is a flowchart of an embodiment of a main routine that may be performed during operation of one or more of the gaming units.

FIG. 6 is a flowchart of a main operating routine 200 that may be stored in the memory of the controller 100. Referring to FIG. 6, the main routine 200 may begin operation at block 202 during which an attraction sequence may be performed in an attempt to induce a potential player in a casino to play the gaming unit 20. The attraction sequence may be performed by displaying one or more video images on the video display unit 70 and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated and a game-selection display may be generated on the video display unit 70 at block 206 to allow the player to select a game available on the gaming unit 20. The gaming unit 20 may detect an input at block 204 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. At block 208, if no game selection is made within a given period of time, the operation may branch back to block 202.

After one of the routines 210, 220, 230, 240, 250 has been performed to allow the player to play one of the games, block 260 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 262 based on the outcome of the game(s) played by the player. The operation may then return to block 202. If the player did not wish to quit as determined at block 260, the routine may return to block 208 where the game-selection display may again be generated to allow the player to select another game.

It should be noted that although five gaming routines are shown in FIG. 6, a different number of routines could be included to allow play of a different number of games. The gaming unit 20 may also be programmed to allow play of different games.

Figure 7:
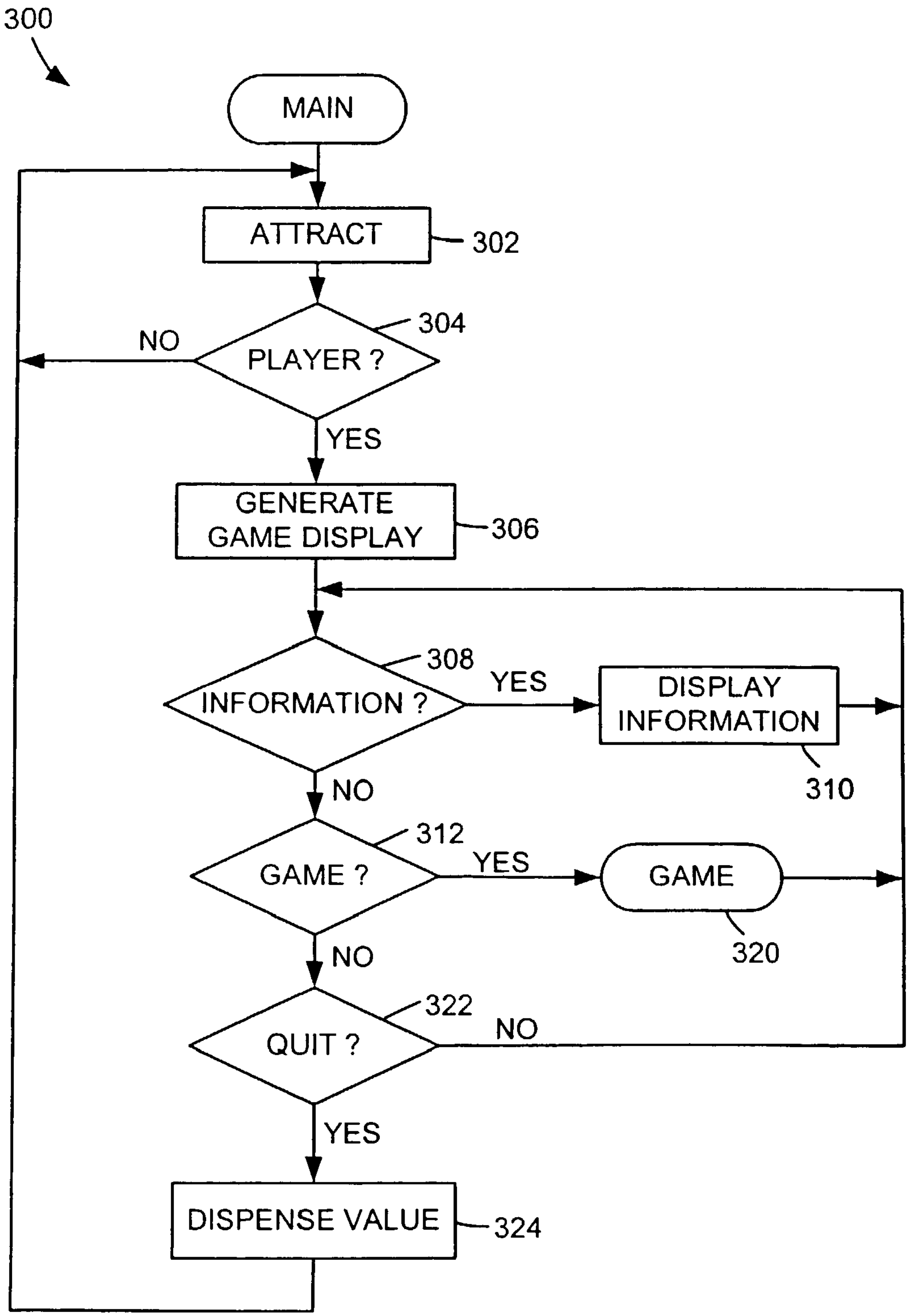
FIG. 7 is a flowchart of an alternative embodiment of a main routine that may be performed during operation of one or more of the gaming units.

FIG. 7 is a flowchart of an alternative main operating routine 300 that may be stored in the memory of the controller 100. The main routine 300 may be utilized for gaming units 20 that are designed to allow play of only a single game or single type of game. Referring to FIG. 7, the main routine 300 may begin operation at block 302 during which an attraction sequence may be performed in an attempt to induce a potential player in a casino to play the gaming unit 20. The attraction sequence may be performed by displaying one or more video images on the video display unit 70 and/or causing one or more sound segments, such as voice or music, to be generated via the speakers 62.

During performance of the attraction sequence, if a potential player makes any input to the gaming unit 20 as determined at block 304, the attraction sequence may be terminated and a game display may be generated on the video display unit 70 at block 306. The game display generated at block 306 may include, for example, an image of the casino game that may be played on the gaming unit 20 and/or a visual message to prompt the player to deposit value into the gaming unit 20. At block 308, the gaming unit 20 may determine if the player requested information concerning the game, in which case the requested information may be displayed at block 310. Block 312 may be used to determine if the player requested initiation of a game, in which case a game routine 320 may be performed. The game routine 320 could be any game routines, such as one of the five game routines 210, 220, 230, 240, 250, or another game routine. The details of the operations of the game routines and their methods of implementation are known to those skilled in the art.

After the routine 320 has been performed to allow the player to play the game, block 322 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 324 based on the outcome of the game(s) played by the player. The operation may then return to block 302. If the player did not wish to quit as determined at block 322, the program may branch back to block 308. The following descriptions include embodiments of video images that may be displayed on the primary display area 70*a* that correspond to particular game routines that may be performed by the controller.

Video Poker

Figure 8:
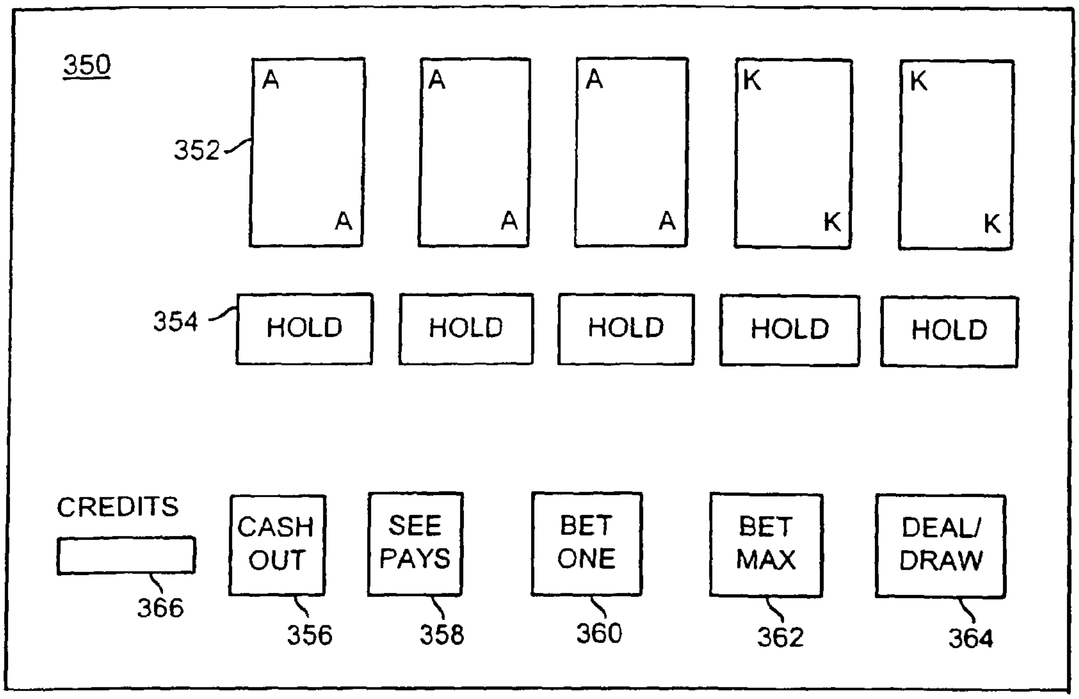
FIG. 8 is an illustration of an embodiment of a visual display that may be displayed during performance of a video poker routine of FIG. 10.

FIG. 8 is an exemplary display 350 that may be shown on the video display unit 70 during performance of the video poker routine 210 shown schematically in FIG. 6. Referring to FIG. 8, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the video display unit 70 is provided with a touch-sensitive screen, the buttons 354, 356, 358, 360, 362, 364 may form part of the video display 350. Alternatively, one or more of those buttons may be provided as part of a control panel that is provided separately from the video display unit 70.

Figure 10:
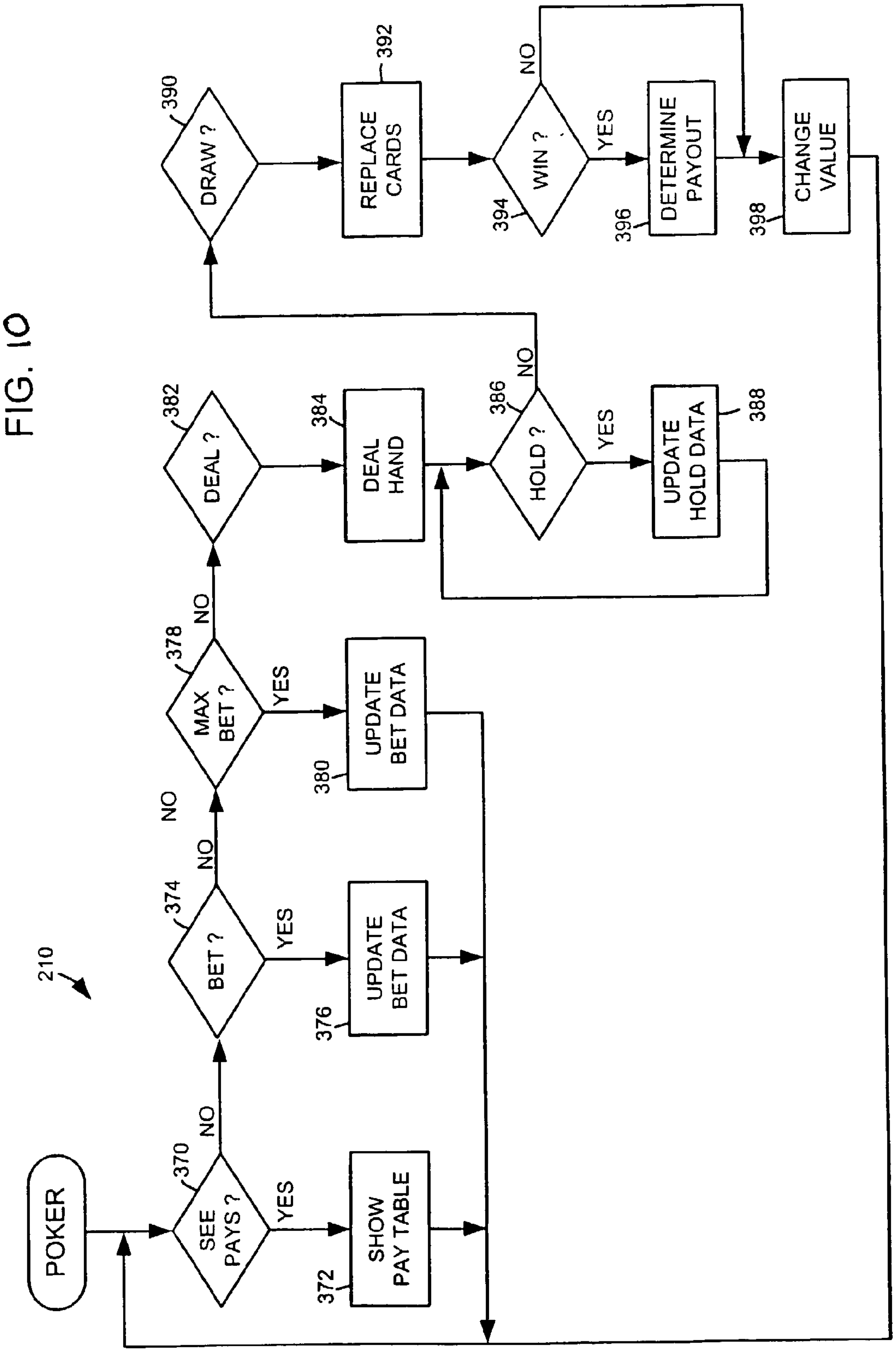
FIG. 10 is a flowchart of an embodiment of a video poker routine that may be performed by one or more of the gaming units.

FIG. 10 is a flowchart of the video poker routine 210 shown schematically in FIG. 6. Referring to FIG. 10, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 8).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 9:
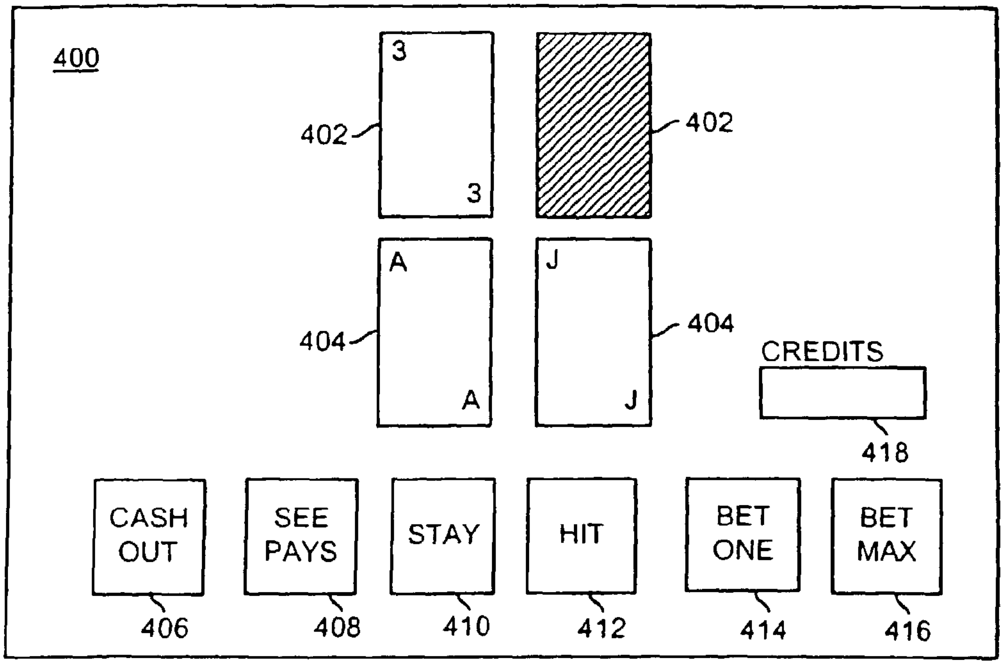
FIG. 9 is an illustration of an embodiment of a visual display that may be displayed during performance of a video blackjack routine of FIG. 11.

FIG. 9 is an exemplary display 400 that may be shown on the video display unit 70 during performance of the video blackjack routine 220 shown schematically in FIG. 6. Referring to FIG. 9, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the video display unit 70 is provided with a touch-sensitive screen, the buttons 406, 408, 410, 412, 414, 416 may form part of the video display 400. Alternatively, one or more of those buttons may be provided as part of a control panel that is provided separately from the video display unit 70.

Figure 11:
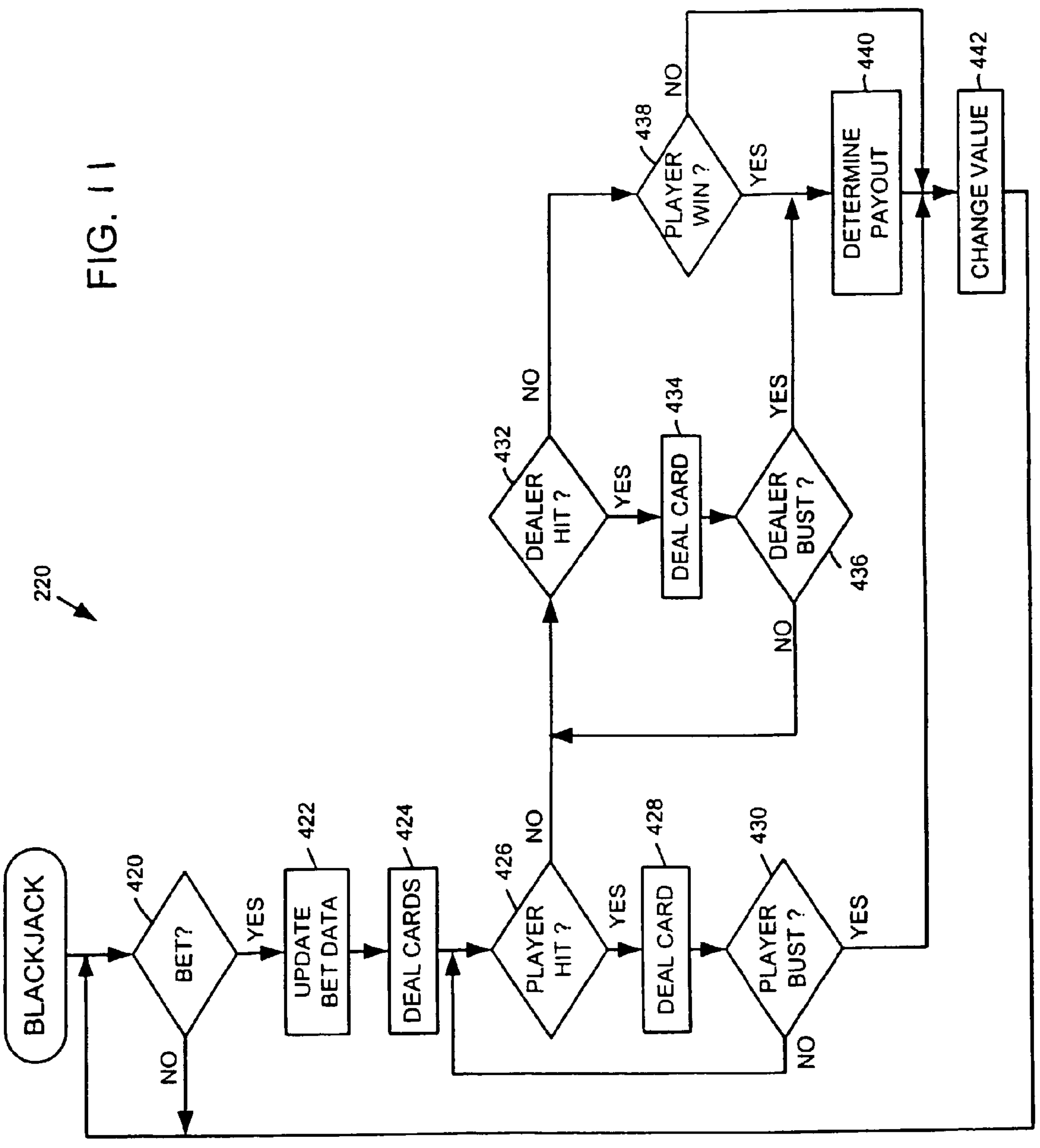
FIG. 11 is a flowchart of an embodiment of a video blackjack routine that may be performed by one or more of the gaming units.

FIG. 11 is a flowchart of the video blackjack routine 220 shown schematically in FIG. 6. Referring to FIG. 11, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440.

The cumulative value or number of credits may also be displayed in the display area 418 (FIG. 9).

Video Slots

FIG. 12 is an exemplary display 450 that may be shown on the video display unit 70 during performance of the slots routine 230 shown schematically in FIG. 6. Referring to FIG. 12, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 14:
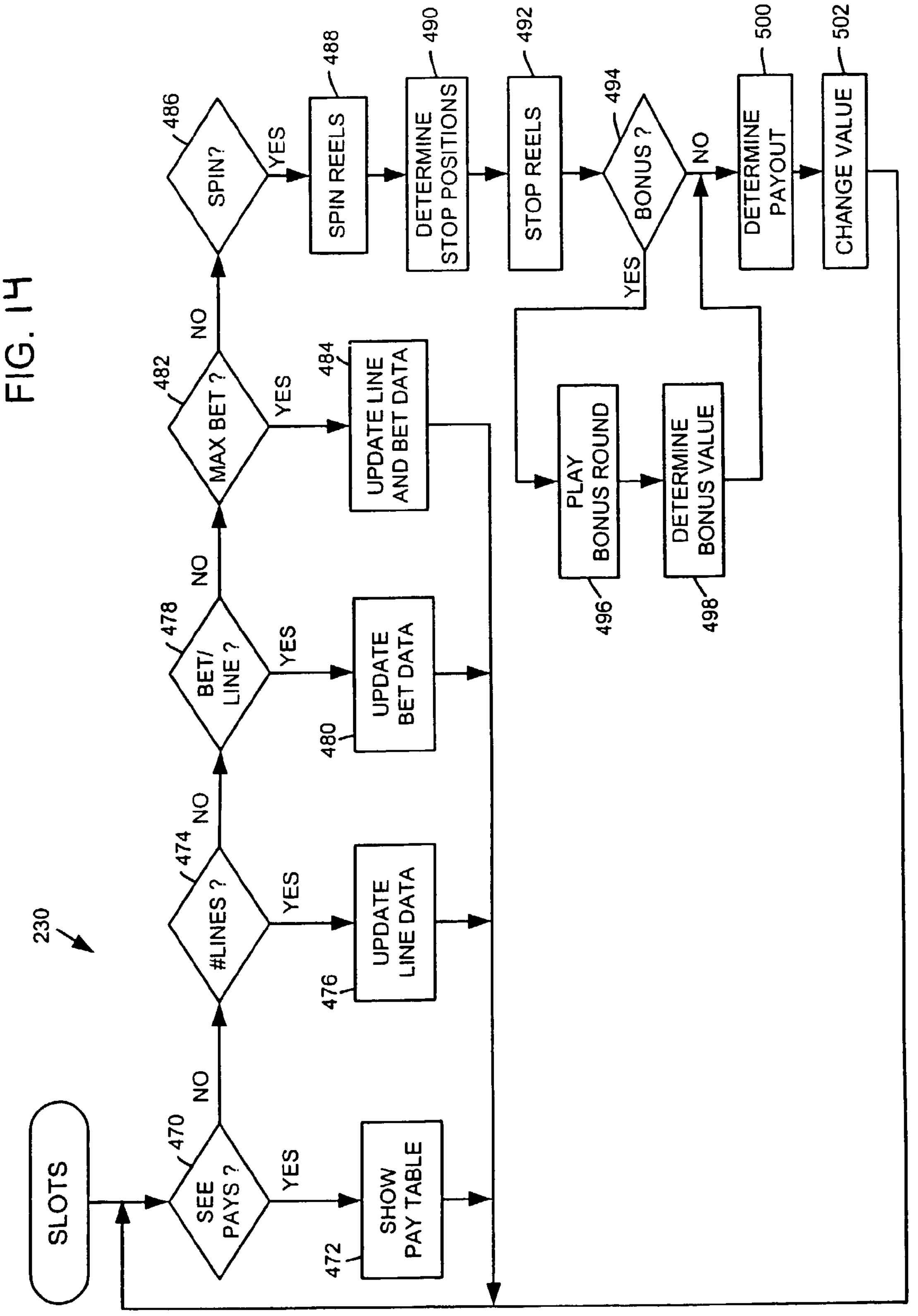
FIG. 14 is a flowchart of an embodiment of a slots routine that may be performed by one or more of the gaming units.

FIG. 14 is a flowchart of the slots routine 230 shown schematically in FIG. 6. Referring to FIG. 14, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead.

Video Keno

FIG. 13 is an exemplary display 520 that may be shown on the video display unit 70 during performance of the video keno routine 240 shown schematically in FIG. 6. Referring to FIG. 13, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the video display unit 70 is provided with a touch-sensitive screen, the buttons may form part of the video display 520. Alternatively, one or more of those buttons may be provided as part of a control panel that is provided separately from the video display unit 70.

Figure 15:
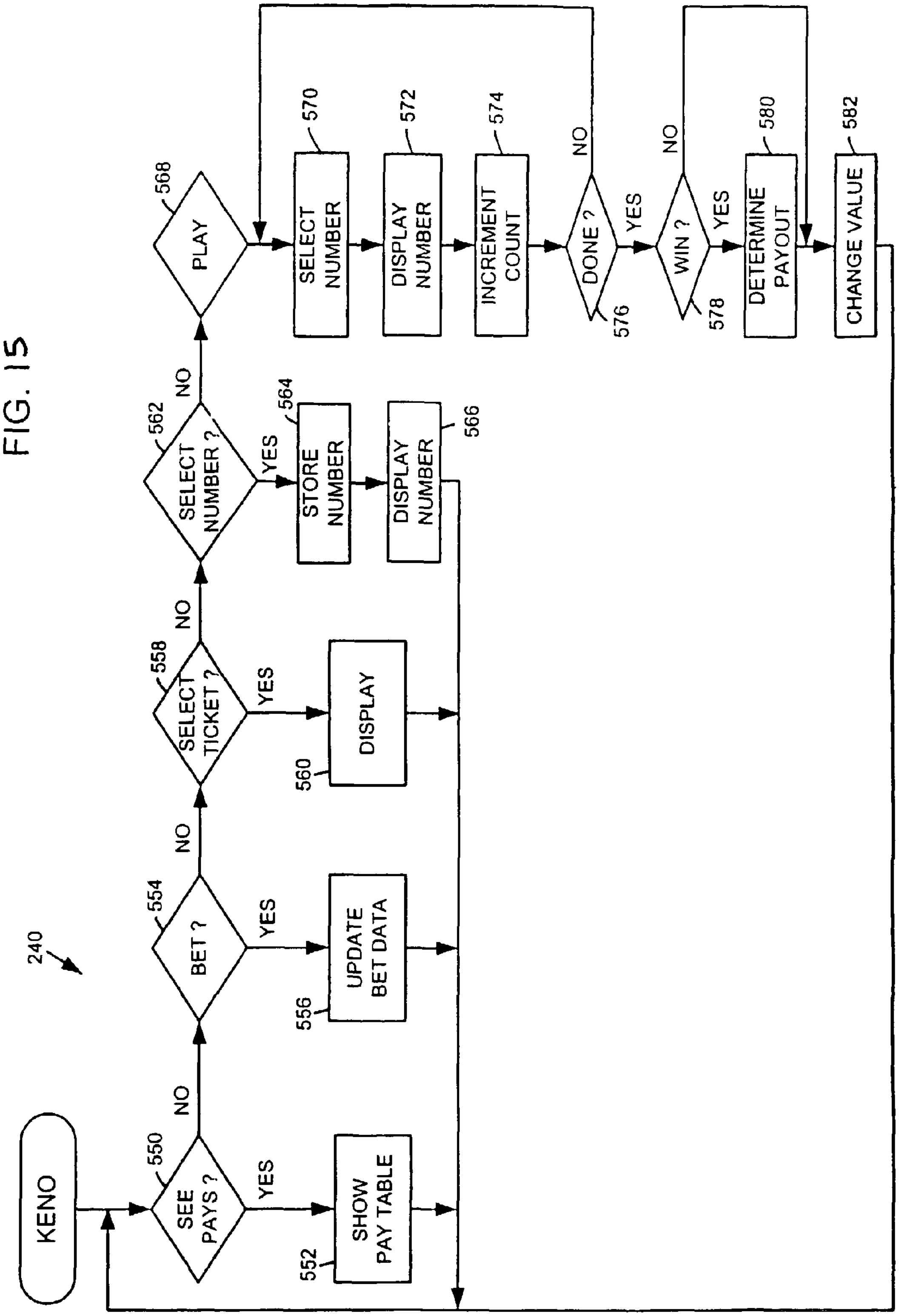
FIG. 15 is a flowchart of an embodiment of a video keno routine that may be performed by one or more of the gaming units.

FIG. 15 is a flowchart of the video keno routine 240 shown schematically in FIG. 6. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 15, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 13).

Video Bingo

Figure 16:
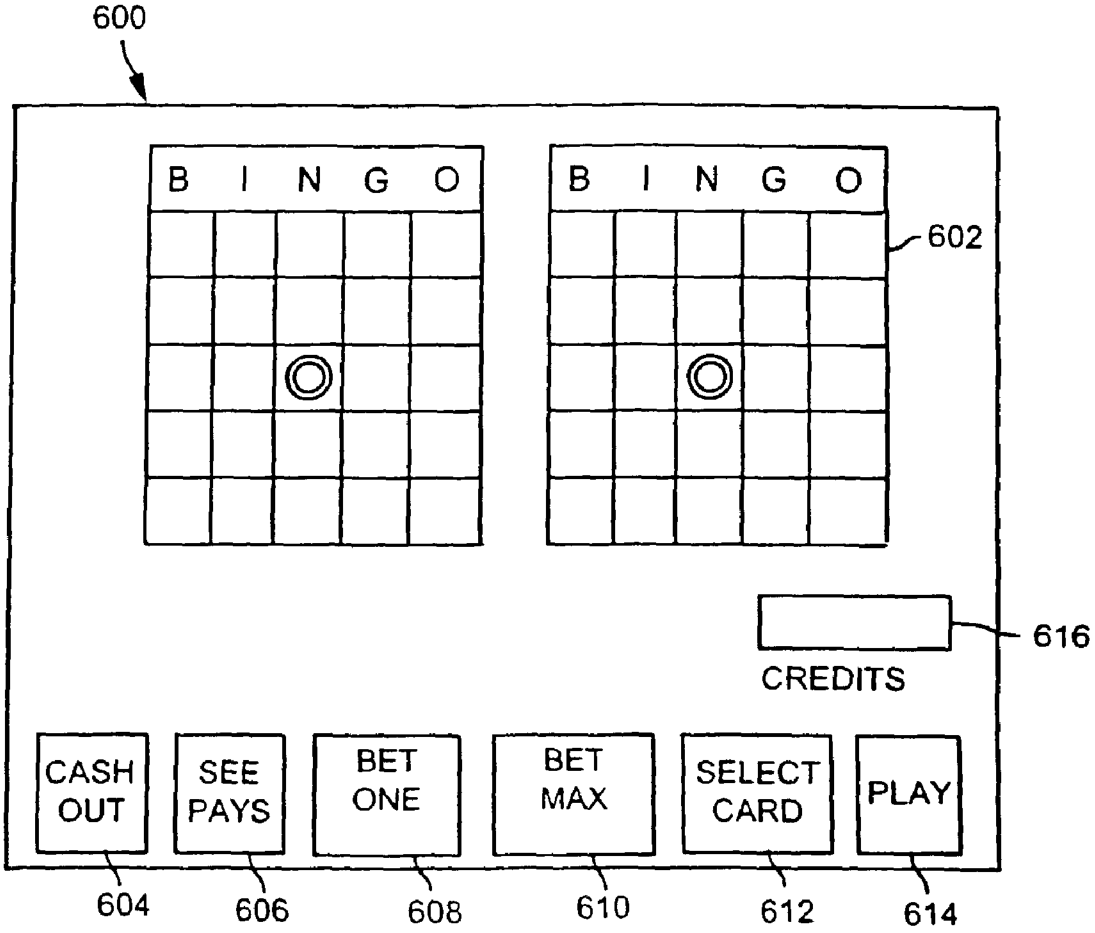
FIG. 16 is an illustration of an embodiment of a visual display that may be displayed during performance of a video bingo routine.

FIG. 16 is an exemplary display 600 that may be shown on the video display unit 70 during performance of the video bingo routine 250 shown schematically in FIG. 6. Referring to FIG. 16, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the video display unit 70 is provided with a touch-sensitive screen, the buttons may form part of the video display 600. Alternatively, one or more of those buttons may be provided as part of a control panel that is provided separately from the video display unit 70.

Figure 17:
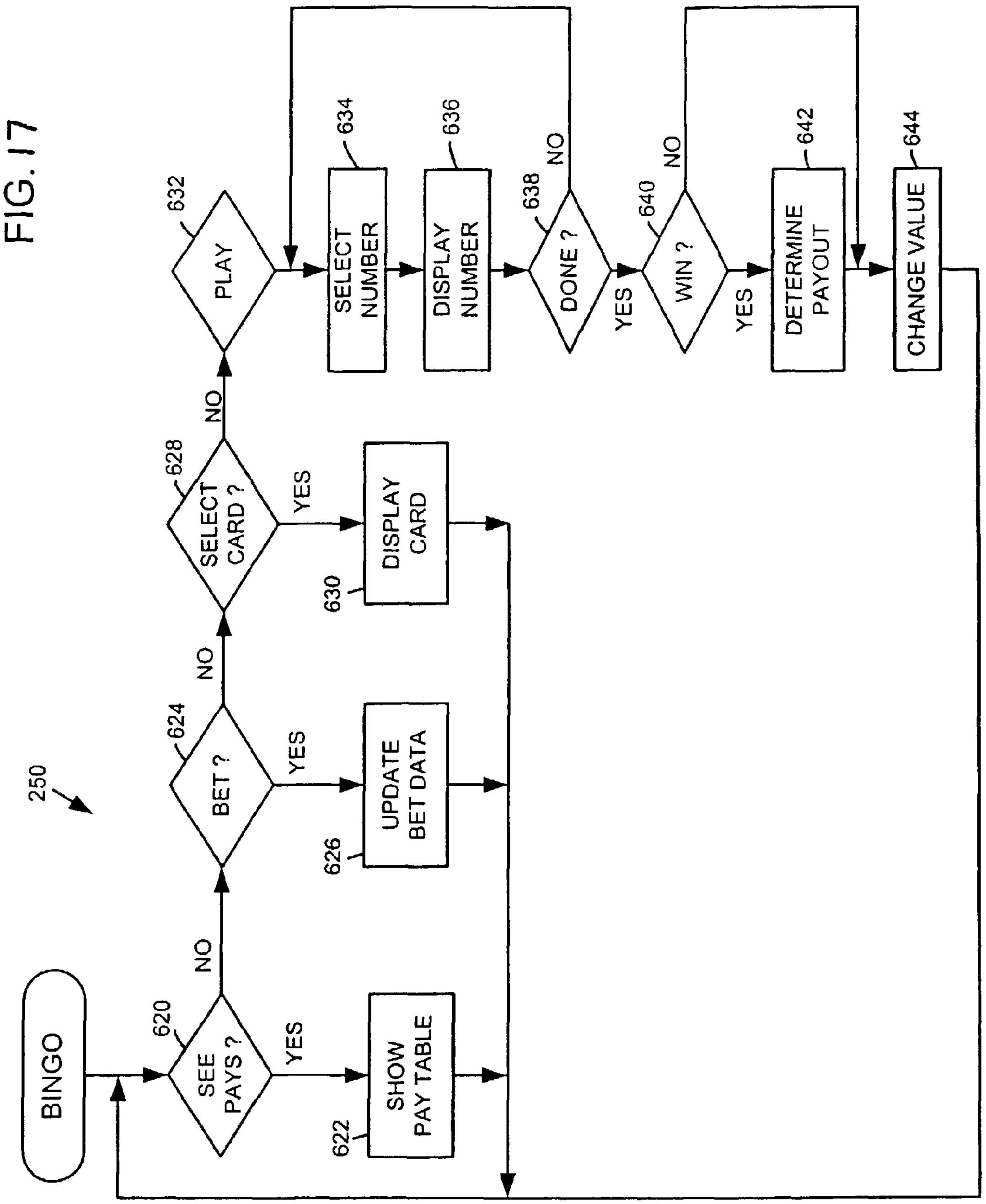
FIG. 17 is a flowchart of an embodiment of a video bingo routine that may be performed by one or more of the gaming units.

FIG. 17 is a flowchart of the video bingo routine 250 shown schematically in FIG. 6. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 17, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 16).

What is claimed is:

1. An upright or slant-top gaming apparatus, comprising:

a housing, wherein said housing includes a main housing portion and a first removable panel coupled to said main housing portion, wherein said first removable panel is removably coupled to said main housing portion and includes first, second, and third openings, said first removable panel also including an insert for one or more of coins, paper currency, and cards, said first removable panel substantially the same size as a frontal area of the upright or slant-top gaming apparatus, the frontal area bounded by a top side, a bottom side, and two lateral sides of the upright or slant-top gaming apparatus;

a primary display screen and a top panel secondary display screen, each display screen capable of generating video images, said display screens being positioned relative to said main housing portion and said first removable panel so that a first portion of said primary display screen is visible through said first opening of said first removable panel and a first portion of said top panel secondary display screen is visible through said second opening of said first removable panel;

a bottom panel, said bottom panel being positioned relative to said main housing portion and said first removable panel so that a first portion of said bottom panel is visible through said third opening of said first removable panel;

a value input device;

a controller operatively coupled to said display screens and said value input device, said controller comprising a processor and a memory operatively coupled to said processor, said controller being programmed to allow a person to make a wager, said controller being programmed to run at least a first game routine or a second game routine, said controller being programmed to cause a first video image to be generated on said first portion of said primary display screen and a second video image to be generated on said first portion of said top panel secondary display screen, at least one of said first and second images representing one of the following games: video poker, video blackjack, video slots, video keno and video bingo, said at least one video image comprising an image of at least five playing cards if said game comprises video poker, said at least one video image comprising an image of a plurality of simulated slot machine reels if said game comprises video slots, said at least one video image comprising an image of a plurality of playing cards if said game comprises video blackjack, said at least one video image comprising an image of a plurality of keno numbers if said game comprises video keno, said at least one video image comprising an image of a bingo grid if said game comprises video bingo, and said controller being programmed to determine a value payout associated with an outcome of said game; and wherein said first removable panel corresponds to said first game routine and can be replaced by a second removable panel including fourth, fifth, and sixth openings, said fourth opening corresponding to said primary display screen, said fifth opening corresponding to said top panel secondary display screen, said sixth opening corresponding to said bottom panel, the first removable panel and the second removable panel at least differing from each other with respect to dimensions or locations of the first opening and the fourth opening, the second opening and the fifth opening, or the third opening and the sixth opening, wherein said second removable panel corresponds to said second game routine, and wherein said second game routine is different from said first game routine, thereby allowing said gaming apparatus to be effectively transformed by replacing said first removable panel with said second removable panel with said controller being programmed to run said second game routine.

2. A gaming apparatus as defined in claim 1, wherein said housing comprises a first housing portion and a second housing portion.

3. A gaming apparatus as defined in claim 1, wherein said first removable panel includes at least one of said value input device and an input control panel.

4. A gaming apparatus as defined in claim 1, wherein a transparent material is disposed over at least one of said openings of said first removable panel or said second removable panel.

5. A gaming apparatus as defined in claim 1, wherein said primary display screen comprises a flat panel display screen.

6. A gaming apparatus as defined in claim 1, wherein said primary display screen comprises a display screen having a width in the range of about of 36-64 centimeters and a height in the range of about 28-104 centimeters.

7. A gaming apparatus as defined in claim 1, wherein said primary display screen has a depth in the range of about 0.2-200 millimeters.

8. A gaming apparatus as defined in claim 1, wherein at least one of said first and second video images represents at least one of the following: a bonus game, a payout table, game information, game instructions and an attraction sequence.

9. A gaming apparatus as defined in claim 1, wherein at least one of said first and second video images are at least one of a static video image and an active video image.

10. A gaming system comprising a plurality of gaming apparatuses as defined in claim 1, said gaming apparatuses being interconnected to form a network of gaming apparatuses.

11. A gaming system as defined in claim 10, wherein said gaming apparatuses are interconnected via the Internet.

12. A gaming apparatus as recited in claim 1, wherein said gaming apparatus is configured to receive said first and second game routines from a gaming server.

13. An upright or slant-top gaming apparatus, comprising:

a housing, wherein said housing includes a main housing portion and a first removable panel coupled to said main housing portion, wherein said first removable panel is removably coupled to said main housing portion and includes first, second, and third openings, said first removable panel also including an insert for one or more of coins, paper currency, and cards, said first removable panel substantially the same size as a frontal area of the upright or slant-top gaming apparatus, the frontal area bounded by a top side, a bottom side, and two lateral sides of the upright or slant-top gaming apparatus;

a primary display screen and a top panel secondary display screen, each display screen capable of generating video images, said display screens being positioned relative to said main housing portion and said first removable panel so that a first portion of said primary display screen is visible through said first opening of said first removable panel and a first portion of said top panel secondary display screen is visible through said second opening of said first removable panel;

a bottom panel, said bottom panel being positioned relative to said main housing portion and said first removable panel so that a first portion of said bottom panel is visible through said third opening of said first removable panel;

a value input device;

a controller operatively coupled to said display screens and said value input device, said controller comprising a processor and a memory operatively coupled to said processor, said controller being programmed to allow a person to make a wager, said controller being programmed to run at least a first game routine or a second game routine, said controller being programmed to cause a first video image to be generated on said first portion of said primary display screen and a second video image to be generated on said first portion of said top panel secondary display screen, at least one of said first and second images representing a casino game, and said controller being programmed to determine, after said at least one video image has been displayed, a value payout associated with an outcome of said game represented by said at least one video image; and wherein said first removable panel corresponds to said first game routine and can be replaced by a second removable panel including fourth, fifth, and sixth openings, said fourth opening corresponding to said primary display screen, said fifth opening corresponding to said top panel secondary display screen, said sixth opening corresponding to said bottom panel, the first removable panel and the second removable panel at least differing from each other with respect to dimensions or locations of the first opening and the fourth opening, the second opening and the fifth opening, or the third opening and the sixth opening, wherein said second removable panel corresponds to said second game routine, and wherein said second game routine is different from said first game routine, thereby allowing said gaming apparatus to be effectively transformed by replacing said first removable panel with said second removable panel with said controller being programmed to run said second game routine.

14. A gaming apparatus as defined in claim 13, wherein said second removable panel includes at least one of said value input device and an input control panel.

15. A gaming apparatus as defined in claim 13, wherein a transparent material is disposed over at least one of said openings of said first removable panel or second removable panel.

16. A gaming apparatus as defined in claim 13, wherein said primary display screen comprises a flat panel display screen.

17. A gaming apparatus as defined in claim 13, wherein said primary display screen comprises a display screen having a width in the range of about of 36-64 centimeters and a height in the range of about 28-104 centimeters.

18. A gaming apparatus as defined in claim 13, wherein said primary display screen has a depth in the range of about 0.2-200 millimeters.

19. A gaming apparatus as defined in claim 13, wherein at least one of said first and second video images represents at least one of the following: a bonus game, a payout table, game information, game instructions and an attraction sequence.

20. A gaining apparatus as defined in claim 13, wherein at least one of said first and second video images are at least one of a static video image and an active video image.

21. A gaming system comprising a plurality of gaming apparatuses as defined in claim 13, said gaming apparatuses being interconnected to form a network of gaming apparatuses.

22. A gaming system as defined in claim 21, wherein said gaming apparatuses are interconnected via the Internet.

23. An upright or slant-top gaming apparatus, comprising:

a housing, wherein said housing includes a main housing portion and a first removable panel coupled to said main housing portion, wherein said first removable panel is removably coupled to said main housing portion and includes first, second, and third openings, said first removable panel also including an insert for one or more of coins, paper currency, and cards, said first removable panel substantially the same size as a frontal area of the upright or slant-top gaming apparatus, the frontal area bounded by a top side, a bottom side, and two lateral sides of the upright or slant-top gaming apparatus;

a bottom panel, said bottom panel being positioned relative to said main housing portion and said first removable panel so that a first portion of said bottom panel is visible through said third opening of said first removable panel;

a primary display screen and a top panel secondary display screen, each display screen capable of generating video images, said display screens being positioned relative to said main housing portion and said first removable panel so that a first portion of said primary display screen is visible through said first opening of said first removable panel and a first portion of said top panel secondary display screen is visible through said second opening of said first removable panel;

a value input device;

a controller operatively coupled to said display screens and said value input device, said controller comprising a processor and a memory operatively coupled to said processor, said controller being programmed to allow a person to make a wager, said controller being programmed to run at least a first game routine or a second game routine, said controller being programmed to allow a person to make a payline selection, said controller being programmed to cause a first video image to be generated on said first portion of said first display screen and a second video image to be generated on said first portion of said top panel secondary display screen, at least one of said first and second images comprises a plurality of simulated slot machine reels of a slots game, each of said slot machine reels having a plurality of slot machine symbols, and said controller being programmed to determine a value payout associated with said outcome of said slots game, said controller being programmed to determine said value payout based on a configuration of said slot machine symbols; and wherein said first removable panel corresponds to said first game routine and can be replaced by a second removable panel including fourth, fifth, and sixth openings, said fourth opening corresponding to said primary display screen, said fifth opening corresponding to said top panel secondary display screen, said sixth opening corresponding to said bottom panel, the first removable panel and the second removable panel at least differing from each other with respect to dimensions or locations of the first opening and the fourth opening, the second opening and the fifth opening, or the third opening and the sixth opening, wherein said second removable panel corresponds to said second game routine, and wherein said second game routine is different from said first game routine, thereby allowing said gaming apparatus to be effectively transformed by replacing said first removable panel with said second removable panel with said controller being programmed to run said second game routine.

24. A gaming apparatus as defined in claim 23, wherein said first removable panel or said second removable panel includes at least one of said value input device and an input control panel.

25. A gaming apparatus as defined in claim 23, wherein a transparent material is disposed over at least one of said openings of said first removable panel or second removable panel.

26. A gaming apparatus as defined in claim 23, wherein said controller is programmed to allow a user to select a number of paylines.

27. A gaming apparatus as defined in claim 23, wherein said primary display screen comprises a flat panel display screen.

28. A gaming apparatus as defined in claim 23, wherein said primary display screen comprises a display screen having a width in the range of about of 36-64 centimeters and a height in the range of about 28-104 centimeters.

29. A gaming apparatus as defined in claim 23, wherein said primary display screen has a depth in the range of about 0.2-200 millimeters.

30. A gaming apparatus as defined in claim 23, wherein at least one of said first and second video images represents at least one of the following: a bonus game, a payout table, game information, game instructions and an attraction sequence.

31. A gaming apparatus as defined in claim 23, wherein at least one of said first and second video images are at least one of a static video image and an active video image.

32. A gaming system comprising a plurality of gaming apparatuses as defined in claim 23, said gaming apparatuses being interconnected to form a network of gaming apparatuses.

33. A gaming system as defined in claim 32, wherein said gaming apparatuses are interconnected via the Internet.

34. An upright or slant-top gaming apparatus, comprising:

a housing having a first removable front panel that includes first, second, and third openings, said first removable front panel also including an insert for one or more of coins, paper currency, and cards, wherein said first removable panel is removably coupled to said main housing, said first removable panel substantially the same size as a frontal area of the upright or slant-top gaming apparatus, the frontal area bounded by a top side, a bottom side, and two lateral sides of the upright or slant-top gaming apparatus;

a primary display screen and a top panel secondary display screen, each display screen capable of generating video images, said display screens being positioned relative to said housing so that a first portion of said primary display screen is visible through said first opening of said first removable front panel and so that a first portion of said top panel secondary display screen is visible through said second opening of said first removable front panel;

a value input device;

a bottom panel, said bottom panel being positioned relative to said main housing portion and said first removable panel so that a first portion of said bottom panel is visible through said third opening of said first removable front panel;

a controller operatively coupled to said display screens and said value input device, said controller comprising a processor and a memory operatively coupled to said processor, said controller being programmed to allow a person to make a wager, said controller being programmed to run at least a first game routine or a second game routine, said controller being programmed to cause a first video image to be generated on said first portion of said primary display screen and a second video image to be generated on said first portion of said top panel secondary display screen, at least one of said first and second images representing a casino game, and said controller being programmed to determine, after said at least one video image has been displayed, a value payout associated with an outcome of said game represented by said at least one video image; and wherein said first removable panel corresponds to said first game routine and can be replaced by a second removable panel including fourth, fifth, and sixth openings, said fourth opening corresponding to said primary display screen, said fifth opening corresponding to said top panel secondary display screen, said sixth opening corresponding to said bottom panel, the first removable panel and the second removable panel at least differing from each other with respect to dimensions or locations of the first opening and the fourth opening, the second opening and the fifth opening, or the third opening and the sixth opening, wherein said second removable front panel corresponds to said second game routine, and wherein said second game routine is different from said first game routine, thereby allowing said gaming apparatus to be effectively transformed by replacing said first removable front panel with said second removable front panel with said controller being programmed to run said second game routine.

* * * * *